Nov. 5, 1957 S. C. HETH 2,811,819
CUT CROP PICKUP AND CRUSHING MACHINE
Filed April 23, 1954 3 Sheets-Sheet 1
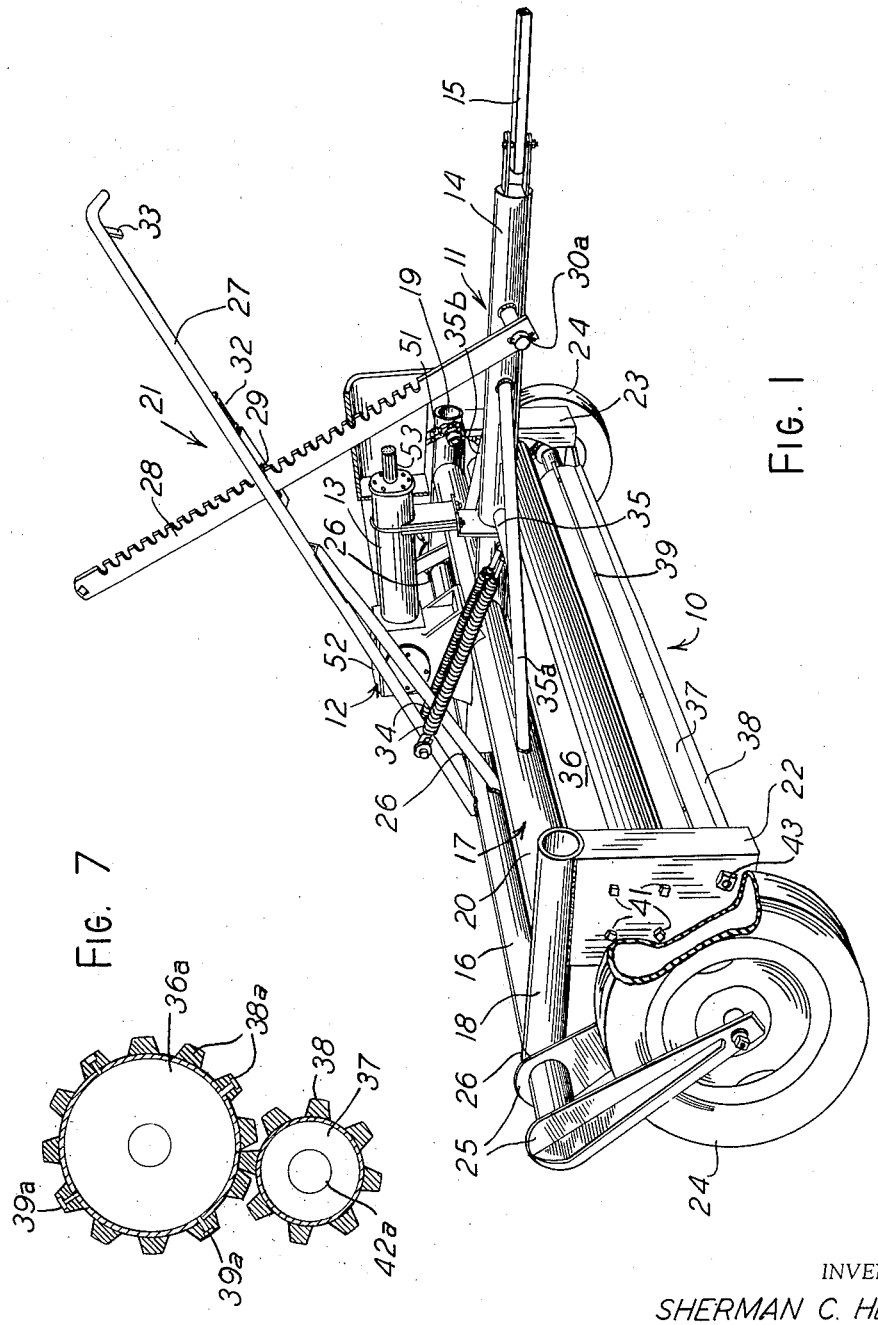
INVENTOR
SHERMAN C. HETH
BY Emerson B Donnell
ATTORNEY

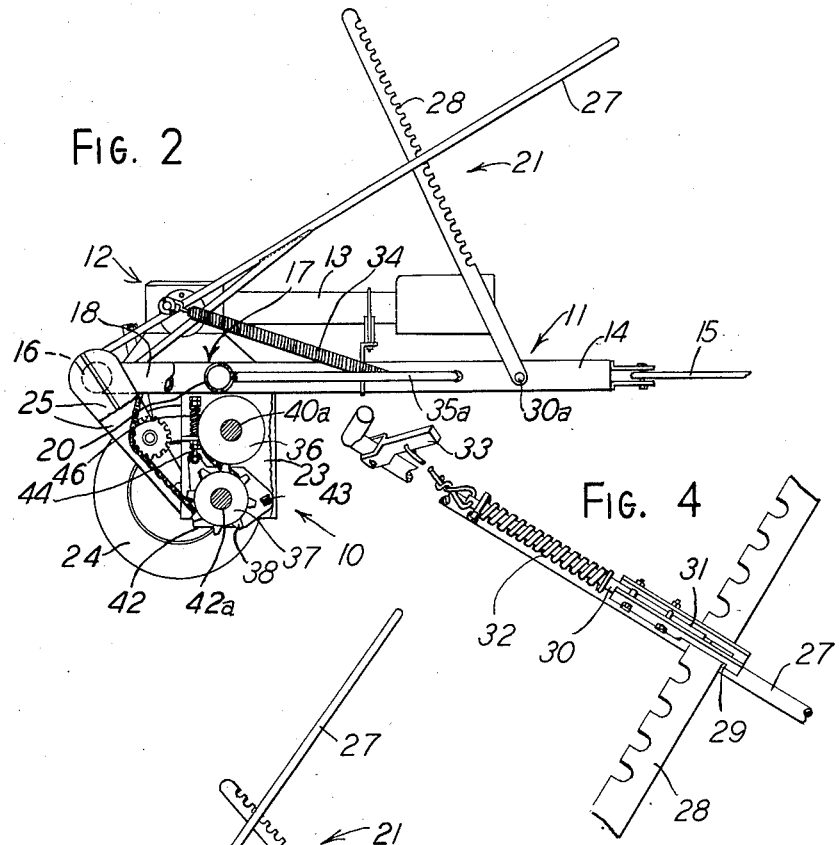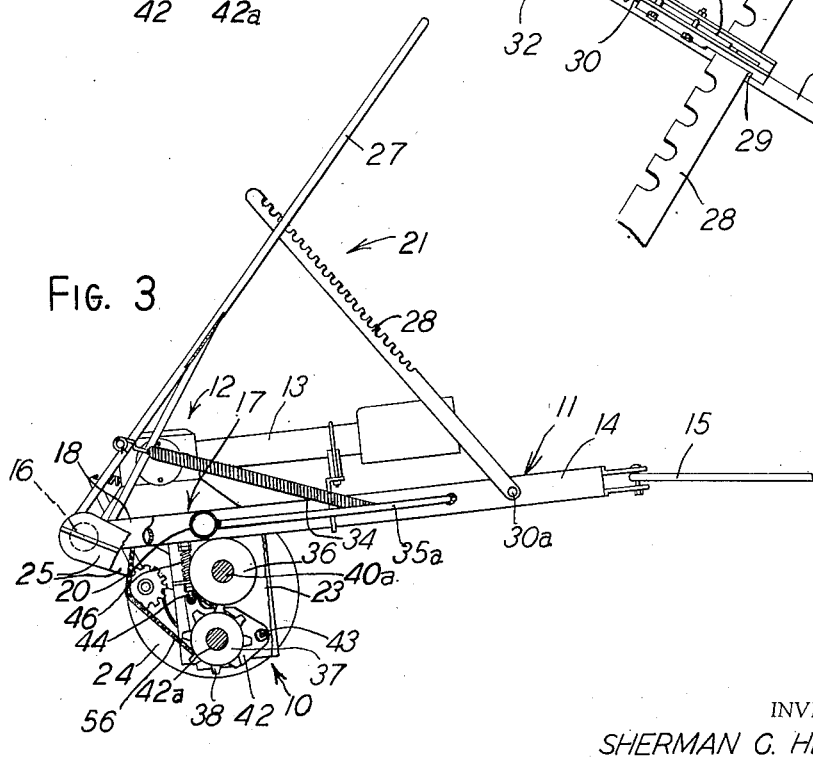

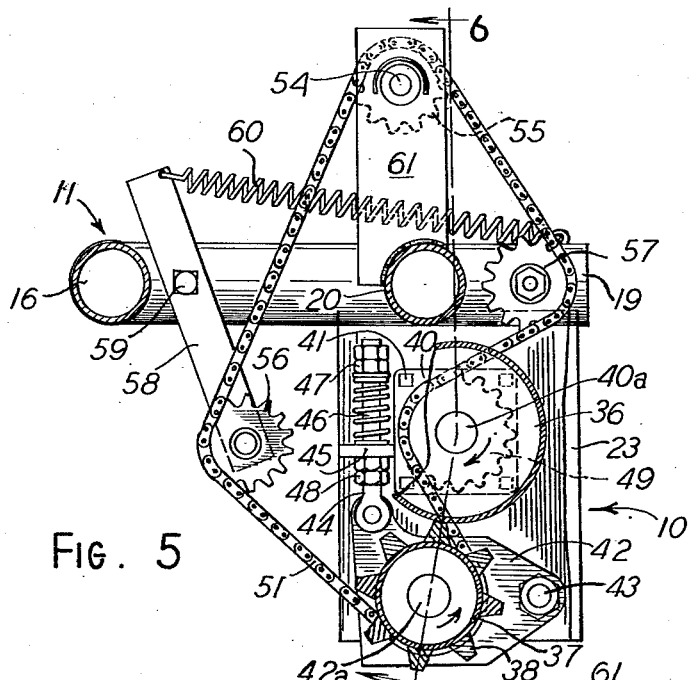
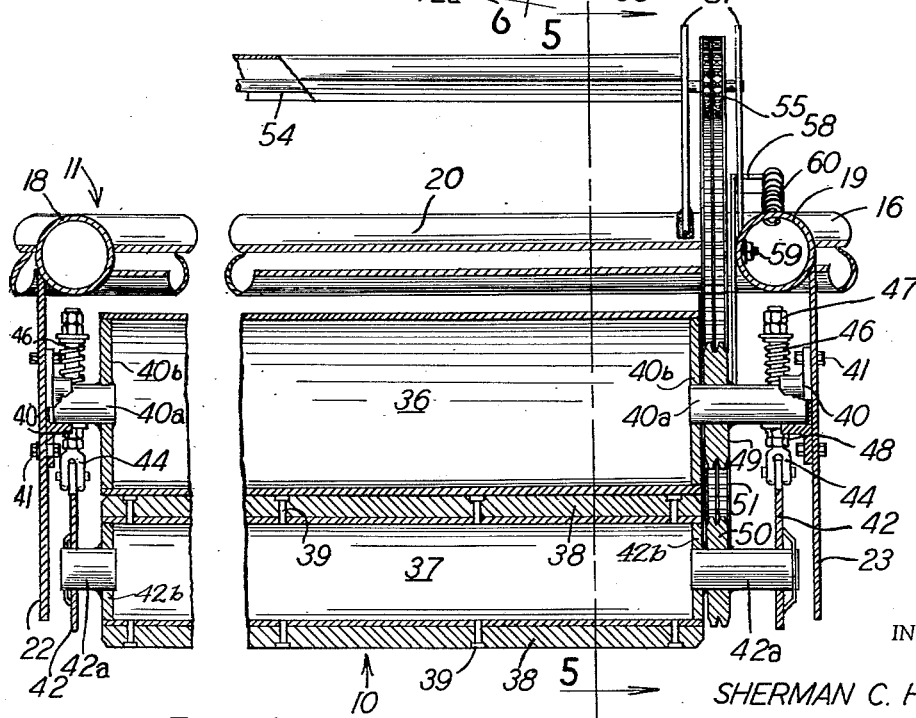

United States Patent Office 2,811,819
Patented Nov. 5, 1957

2,811,819

CUT CROP PICKUP AND CRUSHING MACHINE

Sherman C. Heth, Racine, Wis., assignor to J. I. Case Company, Racine, Wis., a corporation of Wisconsin Application April 23, 1954, Serial No. 425,191

1 Claim. (Cl. 56—1)

My invention relates to a machine for crushing cut crop material and more particularly to a machine having cooperating crushing rolls, one of said rolls being adapted to pick up the cut crop material and direct it between the rolls.

It is, therefore, an object of my invention to provide a crushing machine wherein the cut material is picked up and directed between the rolls by one of said rolls without the aid of any additional crop pickup mechanism.

It is a further object of my invention to provide a crushing machine for cracking the stems or stalks of the cut plant material without breaking the leafy portions thereof in order to facilitate the drying of the crop.

Another object of my invention is to provide means for automatically increasing the spacing between the crushing rolls during the operation of the machine to prevent clogging of the same upon accumulation of large quantities of plant material between the rolls or obstruction thereof by foreign objects.

Still another object of my invention is to provide a means for raising or lowering the pickup roll with respect to the ground, such as, from a transport position to an operative position.

Other and further objects and advantages of my invention will become apparent from the following description and drawings, in which:

Fig. 1 is a side perspective view, with parts broken away and in section, of a crop crusher containing a preferred embodiment of this invention.

Fig. 2 is a side elevational view, on a smaller scale, of the crusher shown in Fig. 1.

Fig. 3 is a side elevational view of the crusher as shown in Fig. 2 but with the operating parts in a different position.

Fig. 4 is a side elevational view of a portion of the crusher shown in Fig. 2 and viewed from the side opposite to that shown in Fig. 2.

Fig. 5 is a side elevational section view enlarged with respect to Fig. 1, of the crusher shown in Fig. 1, said view being taken on the line 5—5 of Fig. 6.

Fig. 6 is a fragmentary front elevation sectional view taken on the line 6—6 of Fig. 5.

Fig. 7 is a sectional view similar to that of Fig. 5 but showing a modification of the crusher.

Similar reference numerals refer to similar parts throughout the views.

Referring to the drawings, the machine embodying the present invention comprises, in a preferred embodiment, a crushing mechanism 10 carried by a movable draft frame designated by the numeral 11. A power transmitting means 12 is carried by the movable draft frame 11 for transmitting the rotary motion from a power connector 13 which is driven by the usual power take-off of a tractor (not shown). Also, the front of the frame 11 is provided with a horizontally extending drawbar 14 which draft connects to a tractor hitch or drawbar 15 extending rearwardly from a tractor, all accomplished in any well known manner. The forward end of the drawbar 14 is adapted to have the usual connection made thereto for attachment to the tractor hitch 15 or any other suitable propelling means.

As herein shown, the movable draft frame 11 comprises a horizontally disposed raised wheel axle 16 and a supporting frame 17. The supporting frame 17 is made up of a pair of horizontal end members 18 and 19 rigidly interconnected by a beam 20 to the drawbar 14. The crushing mechanism 10 is carried between downwardly extending parallel end closures 22 and 23 which in turn are rigidly secured to and depend vertically from the end members 18 and 19, respectively. For carrying the supporting frame 17, a pair of suitable wheels 24 is rotatably mounted between aligned parallel arms 25 which are rigidly secured to the wheel axle 16, adjacent the opposite ends thereof and transversely thereto. The wheels, therefore, are offset with respect to the axle 16.

For a reason hereinafter apparent, the frame 17 can be raised or lowered with respect to the ground. To accomplish this, the axle 16 is journaled in suitable bearing sleeves 26 secured adjacent the rearward ends of the end members 18 and 19 and the drawbar 14. An adjusting means 21 is provided for limiting the lowering of the crushing mechanism 10 or for raising the crushing mechanism with respect to its relation with the ground by regulating the rotation of the wheel axle 16 in the bearings 26. See Figs. 2 and 3. An actuating arm 27 of the adjusting means 21 is secured transversely to the wheel axle 16 by welding or the like. As best shown in Fig. 4, the arm 27 receives a toothed rack 28 in a slot 29 formed in the arm 27. A rod 30 is secured adjacent and parallel to the arm 27 and carries, adjacent its lower end, a dog 31 which is urged by means of a spring or the like 32 into engagement with the teeth of the toothed rack 28. Adjacent its upper end, the rod 30 is connected to a lever 33 which provides the means for raising or lowering the dog 31 into and out of engagement with the teeth of the rack 28. The lower end of the rack 28 is pivotally secured to the drawbar 14 as at 30a. To easily enable the operator to raise the crushing mechanism in relation to the ground, counter balance springs 34 or the like are interposed between the actuating arm 27 and a frame member 35 located between the drawbar 14 and a diagonal brace member 35a which is between the beam 20 and the drawbar 14. A member 35b is braced between the beam 20 and the drawbar 14 on the opposite side of the drawbar 14 and the members 35a and 35b ensure stability of the drawbar 14 with respect to the beam 20. By this construction it should be apparent that the crushing mechanism 10 can be raised or lowered from a transport position, as shown in Fig. 2, to an operating position, as shown in Fig. 3, by rotating the shaft 16 in the bearings 26 through swinging the arm 27 on the rack 28. It will be further apparent that while the adjusting means can raise or hold the crushing mechanism in fixed position with respect to the ground, the weight of the crushing mechanism and the frame 17 alone will tend to lower or bias the crushing mechanism downwardly and consequently place the machine in its operating position when the dog 31 is withdrawn from the rack 28.

The crushing mechanism 10 includes, the present instance, a pair of cooperating oppositely rotating crushing rolls 36 and 37. In the embodiment illustrated, the upper roll 36 is preferably made of metal or other suitable hard material and preferably has a smooth surface. The lower roll 37 is paddle-shaped or fluted in cross section having a plurality of substantially radial vanes or bars 38 extending from the periphery thereof. As seen in Fig. 6, the vanes or bars 38, in the present instance, are preferably castings formed in sections and are secured to the roll 37 by means of bolts 39 or the like threaded or otherwise secured in the roll 37. It will be further noted in the preferred construction that the rows of vanes or paddles 38 are preferably equally spaced one from the other on the roll 37 so as to crush the crop material in cooperation with the roll 36 at equally spaced intervals, as will be explained more fully hereinafter. By providing a construction, as disclosed, wherein the crop material is crushed at spaced intervals instead of being crushed its entire length, the power necessary to drive the pressing rolls is greatly reduced. Also, damage to the leaves of the plant material is considerably lessened a substantial advantage, as it is generally recognized that the leaves of the plant material contain the greatest proportion of the food value of the plant. It has further been found that a plant crushed at spaced intervals will cure in substantially the same length of time as a plant crushed through its entire length as the liquids in those portions of the plant adjacent the spaced crushed areas tend to "bleed" through those crushed areas. It will be further noted that the vanes or bars 38 act as a pickup means for picking up an apron of plant material "as cut" or "as windrowed" and directing the same between the co-operating crushing rolls, as will be further explained.

If the operator wishes to crush the plant material through its entire length, the upper roll can be replaced by a roll 36a, Fig. 7, having vanes 38a similar in construction to the vanes 38 of the roll 37. The vanes 38a are similarly made of castings and secured to the roll 36a, as by the bolts 39a or any other suitable fastening means. The rows of vanes 38a are spaced about the roll 36a at regular intervals so as to intermesh with the rows of paddles or vanes 38 of the roll 37. Since the paddles or vanes 38a are substantially similar in size and construction to the paddles or vanes 38, plant material will be crushed through its entire length when directed between the cooperating rolls. The intermeshing rows of paddles or vanes crush the plant material between the cooperating surfaces and at those portions of the rolls between the ends of the vanes and the periphery of the opposite roll.

As best shown in Fig. 6, the upper roll 36 is carried by aligned shafts 40a journaled in end plates 40 which are secured, as by bolts 41 or the like, to the inner face of the end closures 22 and 23. The shafts 40a are preferably secured to the ends of the roll 36 by spacers 40b welded between the shafts 40a and the roll 36 which is substantially co-axial with the axes of the shafts 40a. The lower roll 37 is carried by shafts 42a which are rotatably journaled in pivotal blocks 42, the blocks 42 being pivotally secured to the inner face of the end closures 22 and 23 as by bolts 43 or the like. The shafts 42a are preferably secured to the ends of the roll 37 by spacers 42b welded between the shafts 42a and the roll 37, the axis of the roll 37 being substantially co-axial with the axes of the shafts 42a. The lower roll 37 is rotatably carried by the pivotal blocks 42 so that the axis of the lower roll is substantially parallel with the horizontal and substantially parallel with the axis of the upper roll 36.

The roll 37 is maintained in compressive engagement with the upper roll 36 by means of studs 44 pivotally secured rearwardly to the blocks 42 and extending upwardly through brackets 45 mounted on the end closures 22 and 23, as seen in Fig. 5. Compression springs 46 are interposed between the brackets 45 and lock nuts 47 threaded on the upper ends of the studs 44 thereby pivoting the blocks 42 upwardly and maintaining the roll 37 in compressive engagement with the roll 36 the arrangement comprising a yielding resistor connected to roll 37. To limit the upward pivotal movement of the blocks 42 by the compression springs 46, lock nuts 48 are threaded on the studs 44 and bear against the undersurface of the brackets 45 when the desired upward pivotal position of the blocks 42 is reached. It will be apparent that when the roll 37 is forced away from the roll 36, as when an excessively large amount of plant material is directed between the rolls, that the pivotal blocks 42 will be pivoted downwardly, the springs 46 being compressed between the lock nuts 47 and the brackets 45. When the excessive amount of plant material has passed through the rolls, the springs 46 will pivot the pivotal blocks 42 upwardly until the roll 37 is again in compressive engagement with the roll 36 or until the lock nuts 48 press against the bracket 45. It will be further apparent that the degree of compression may be varied to suit requirements by shortening or lengthening the compression springs 46 by adjusting the lock nuts 47 and 48.

For rotating the rolls 36 and 37 in opposite directions, as will appear hereinafter, the shafts 40a and 42a adjacent the end member 19 are provided with sprockets 49 and 50 respectively, which sprockets are driven by a chain or the like 51. Power for driving the rolls, in the required directions indicated by the arrows in Fig. 5, is supplied in the present instance by the power take-off of the tractor and directed to the chain 51 by the transmitting means 12 which is carried by the draft frame 11. The transmitting means 12, in the present instance, comprises gearing, not shown, in a gear box 52, and a shaft 53 extending forwardly therefrom for connection with the power take-off. As shown in Fig. 6, a transmission shaft 54 extends laterally from the gear box 52 and is provided adjacent its lateral end with a sprocket 55 which intermeshes with the chain 51. A pair of plates 61 is preferably attached to the frame 17 to extend thereabove and support the shaft 54. As seen in Fig. 5, the chain 51 is trained around an idler sprocket 56, forwardly around the sprocket 50 of the roll 37, rearwardly around the sprocket 49 of the roll 36, around a fixed sprocket 57 rotatably mounted in the end member 19, and around the sprocket 55 of the transmission shaft 54. The idler sprocket 56 is rotatably mounted on an arm 58 which is pivotally secured to the end member 19 as by a pivot bolt 59 or other suitable means. To constantly urge the idler sprocket 56 rearwardly against the chain 51, a spring 60 is interposed between the arm 58 and the end member 19 to tend to pivot the arm rearwardly and maintain chain 51 sufficiently taut.

With this arrangement, it will be obvious that the rolls 36 and 37 are rotated in opposite directions to present a common motion at their contacting points. Also, as shown, the rolls are of a different diametrical size which results in a greater peripheral speed of the larger diameter roll. To eliminate the speed differential, it is preferred that the sprockets 49 and 50 also be different in size to compensate for the difference in roll size. This condition is also true of the roll 36a which is provided with vanes to engage the vanes of roll 37. In this instance, the spacing of the vanes is preferably the same on both of the rolls 37 and 36a, and, since the peripheral speed is the same therebetween, the crop material will be fed through the rolls with a speed common to both rolls.

As previously suggested, the lower roll 37 also acts as a pickup reel for lifting the cut plant material from the ground and directing it between the cooperating surfaces of the crushing rolls, where it is crushed and deposited again upon the ground. The bars or vanes 38 protrude substantially radially from the roll 37 and extend substantially the entire length of the roll, while the outer surfaces of the vanes are substantially parallel with the horizontal. As can be seen in Fig. 3, the end of the lowermost vane 38 extends downwardly from the pivot blocks 42. In the operation of this crushing device, the crushing mechanism 10 is lowered by the adjusting means 21 so that the end of the lowermost vane 38 will barely contact the ground as the crushing machine is drawn forwardly. When the pressing rolls 36 and 37 are rotated, in the direction and manner as already described, the vanes 38 will sweep the apron of cut plant material upwardly and direct it between the rolls 36 and 37. It will be appreciated that great savings in the cost of manufacturing are achieved by providing a machine wherein one of the crushing rolls picks up the cut material and directs it between the rolls, beside cooperating to crush the material.

While specific embodiments of this invention have been shown and described, the invention should be limited only by the appended claim.

I claim:

A cut crop pickup and crushing machine comprising a frame and supporting ground wheels adapted to be drawn over a field of cut plants extending generally parallel to the direction of travel of the machine, a smooth hard backing roll rotatably mounted on said frame, a combined pickup and crushing roll rotatably mounted on the frame beneath and in substantial vertical alignment with said backing roll in close proximity thereto and to the ground, said pickup and crushing roll having circumferentially spaced hard vanes projecting radially from its peripheral face and extending substantially throughout the length thereof for scooping up cut plants and forcibly pressing them at spaced points along their lengths against said backing roll upon rotation of the pickup and crushing roll in a direction so as to move said vanes in an arc extending forwardly and upwardly, and driving means operatively connected to each of said rolls to rotate said pickup and crushing roll in said direction and to simultaneously rotate the backing roll in the opposite direction.

References Cited in the file of this patent

UNITED STATES PATENTS

| | | |
|---|---|---|
| 151,800 | Sampson | June 9, 1874 |
| 660,339 | Russell | Oct. 23, 1900 |
| 2,114,580 | Thompson | Apr. 19, 1938 |
| 2,592,269 | Getz | Apr. 8, 1952 |
| 2,711,622 | Cunningham | June 28, 1955 |